May 23, 1950  K. J. KNUDSEN  2,508,862
ELECTRICAL RELAY
Filed Aug. 23, 1945  2 Sheets-Sheet 1
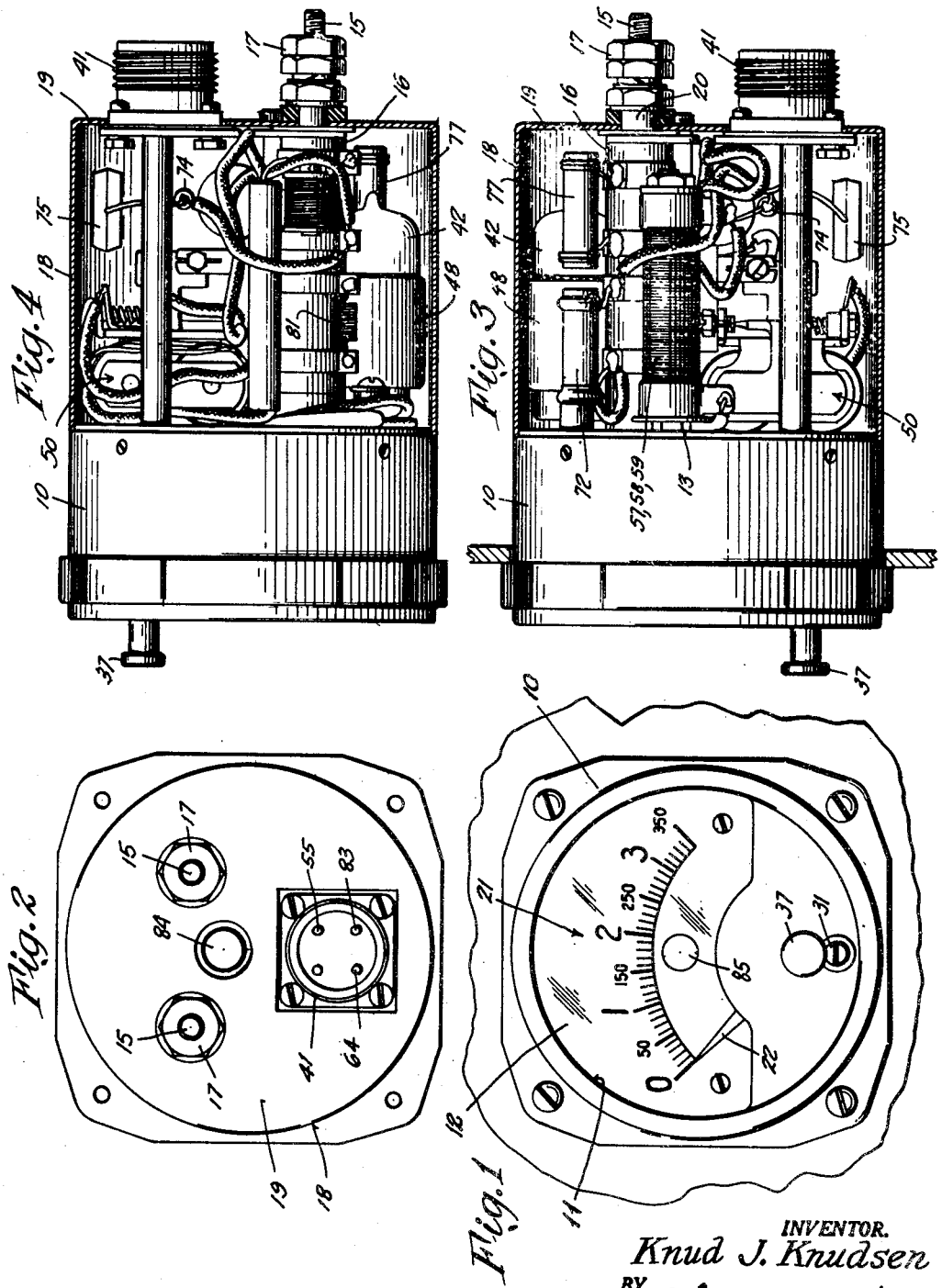
INVENTOR.
Knud J. Knudsen
BY
Johnson and Kline
ATTORNEYS

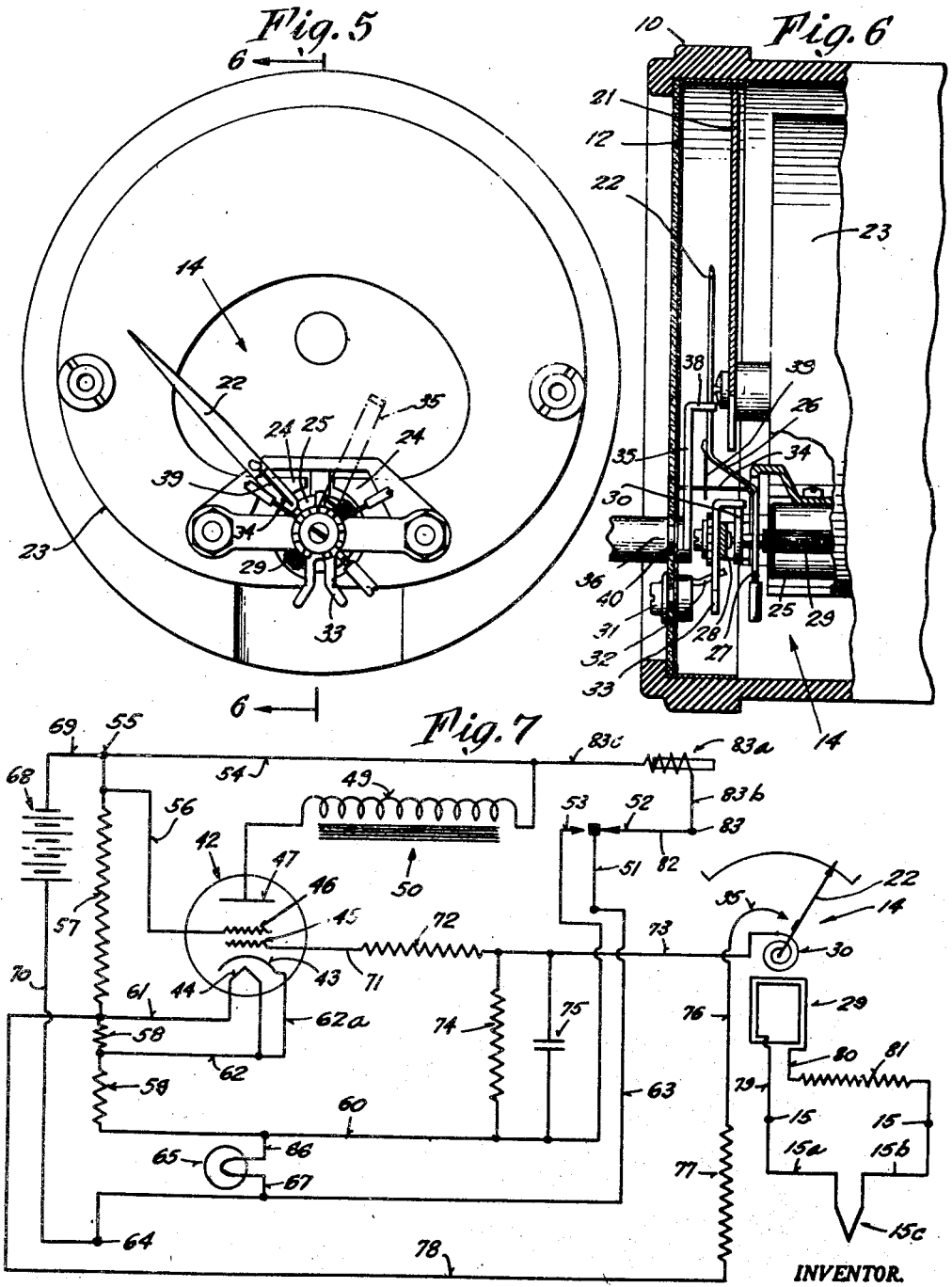

Patented May 23, 1950

2,508,862

UNITED STATES PATENT OFFICE 2,508,862

ELECTRICAL RELAY

Knud J. Knudsen, Naugatuck, Conn., assignor to The Lewis Engineering Company, Naugatuck, Conn., a corporation of Connecticut Application August 23, 1945, Serial No. 612,272

10 Claims. (Cl. 177—311)

This invention relates to electrical relays, and more particularly to sensitive relays which respond to extremely small sources of power such as are obtained from thermocouples and the like. Actual power from controlled circuit is less than $1/100$ of a microwatt.

The relay device of the present invention may be advantageously used in connection with control means which are intended to function in response to variations in the temperature of engines or other mechanisms whose operation is accompanied by heat. For example, in aircraft and the like, an automatic control is desirable to accurately regulate the temperature of the aircraft engines. Such engines are commonly equipped with thermo-couples for providing temperature readings, and a suitable relay device which would accurately respond to thermocouple voltages, and could automatically function to actuate cooling equipment would have considerable practical value.

An object of this invention is to provide a sensitive, instantly responsive, reliable and simple relay device which may be operated by thermocouple and similar small currents, and which may be connected so as to control cooling equipment associated with internal combustion engines and other heat-accompanied mechanisms which are found, for instance, in aircraft.

Another object of the invention is to provide a unitary relay device of the above characteristics, which is small and compact, light in weight, and which may be located, for example, in the cockpit of an aircraft, remote from the mechanism whose heat is to be controlled.

A further object of the invention is to provide a relay device as above which will give readings of the temperature of the mechanism under control, so that a person in the cockpit of an aircraft may be apprised, when desired, of the temperature conditions of the controlled mechanism.

A still further object of the invention is to provide a relay device of the above type, which may be easily and quickly set or adjusted to function at any temperature within a wide range of values.

These and other objects are accomplished, according to the invention, by the provision of a unitary device, having a novel assemblage of electrical components comprising a sensitive-instrument type relay of unique organization, and comprising vacuum tube, electromagnetic and other electrical and circuit components operating in conjunction with the relay and so arranged and interconnected as to produce a reliable sensitive relay action in a compact device having highly desirable characteristics as above stated.

Heretofore, in connection with sensitive-instrument type relays, it has been common practice to provide magnetic contacting elements for the purpose of insuring satisfactory closing of the circuit, and insuring satisfactory current-carrying capacity when the instrument has responded to the predetermined exciting current. Such magnetic contact means have created an undesirable condition, since they would not separate when the instrument energization dropped below the predetermined contact-making value. To overcome this, these prior instrument-type relays have required additional separator mechanisms which, although functioning to separate the contacts, did not do so immediately upon the instrument energization dropping, so that there resulted a time-lag factor, caused by the impossibility of making the contact separating force occur at the instant the instrument coil energization dropped below the predetermined value. Also, by the addition of a separator mechanism, the closed-circuit condition of the relay was changed to an intermittent contact condition, which precluded its use for many important purposes.

In one prior device, clockwork was employed to periodically operate tripping or separating means for the magnetic contacts. This arrangement was not suitable for all purposes since there was always an interval, dependent upon the periodicity of the clockwork mechanism and the occurrence of the drop of instrument coil energization, during which the magnetic contacts of the relay were held together after the coil current had dropped. Moreover, the clockwork and tripping mechanisms periodically separated the magnetic contacts, interrupting the circuit when it was not desired to have such interruption.

Another prior device which employed magnetic contacts utilized a circuit arrangement whereby an opposing energization was applied to the instrument coil to separate the contacts, this energization ceasing upon the said separation, and again becoming existent when the contacts reunited. As a result, there was again produced a constant make-and-break, and therefore the uniting or separating of the contacts was not purely the function of the energization intended to operate the instrument coil.

The disadvantages of these prior instrument-type relays are overcome, according to the present invention, by the provision of a novel, delicate contact means operated by a sensitive-instrument movement, the contact means being non - sticking, non - intermittent, and being adapted to function in conjunction with electrical components and circuit means organized so as to produce in a unitary assemblage, a sensitive and desirable relay action.

In the illustrated embodiment of the invention the instrument-type relay is provided with an extremely fine, resilient, platinum wire contacting element which engages with a second contact when the energization of the instrument coil reaches a predetermined value, this value depending upon the initial setting of the contacts. The fine platinum contact element remains in engagement with the cooperable contact as long as the instrument energization is maintained above the said predetermined value, and when the energization drops below this value, the contacts immediately separate, since they are not held together by magnets or other extraneous means. A sensitive valve circuit is associated with the contact elements of the instrument-type relay in such a manner that the current which must be passed by the elements to operate the circuit is inappreciable, and therefore the contact pressures need not be great, nor augmented by other devices.

The extremely minute currents passing between the relay contact elements are made to control an electromagnetic type relay through the medium of valve means such as a vacuum tube, and the electromagnetic relay is provided with heavy contact means adapted to carry appreciable current, these means being able to control apparatus for regulating the cooling of the engine or other device.

The unitary relay assemblage of this invention is of small size and weight, comprising an instrument-type relay enclosed in the usual small cylindrical instrument casing, and circuit and other electrical components associated with the relay, mounted in compact form on bushed supporting posts extending from the rear of the instrument casing, the said posts serving to carry electrical connector means for the components, and serving also as terminal for the instrument-type relay. The portion of the assemblage which is mounted on the posts at the rear of the casing does not project beyond the cylindrical outline of the latter, so that a cup-like cover may be readily employed to enclose the said rear portion and protect the latter. A complete protective enclosure is thus provided for the entire relay device.

Due to its small size and light weight the present relay device may be readily used in aircraft, and because only a very small current is needed for actuating it, the device may be located at a point remote from the thermocouples or other primary current sources. Thus, it may be mounted on the instrument panel of an aircraft or in any small available space in the cockpit, convenient to an observer.

In addition to operating heavy-duty contacts, the relay device will give a visual indication of the temperature condition of the engine or other mechanism being controlled, since the instrument-type relay may have the usual pointer and scale, and may be calibrated to accurately read the temperatures to which the thermocouples are subjected.

The delicate contact means is so arranged that the stationary element thereof may be quickly and conveniently adjusted by turning a knob extending through the face of the instrument relay.

Other features and advantages will hereinafter appear.

In the accompanying drawings:

Figure 1 is a front or face view of the unitary relay device of the invention.

Fig. 2 is a rear view of the device.

Fig. 3 is a right side elevation, the rear portion of the housing being in section to reveal the electrical and circuit components of the device.

Fig. 4 is a view similar to Fig. 3 but with the unit rotated one hundred and eighty degrees.

Fig. 5 is a front elevation of the sensitive instrument movement of the device.

Fig. 6 is a part-section, part-elevation taken on the line 6—6 of Fig. 5, and

Fig. 7 is a schematic diagram of the relay device.

Referring to Figs. 1 through 4, the relay device of this invention comprises an instrument casing 10 of the usual cylindrical shape having a circular window opening 11 covered by a transparent pane 12 of glass, or other suitable material such as plastic. The casing 10 has a rear wall 13, and forms a closed housing within which the instrument movement 14, Figs. 5 and 6, is mounted and protected.

Extending from the rear wall 13 of the casing 10 are threaded terminal studs 15, Figs. 2, 3 and 4, which pass through elongate insulating bushings 16 and project beyond the ends of the latter to carry nuts 17 for making electrical connection to a circuit to be hereinafter described.

Disposed to the rear of the wall 13 and about the bushings 16, and mounted thereon is an assemblage of a vacuum tube, resistors, condensers, and other electrical and circuit components which are arranged and connected so as to cooperate with the contact means of the instrument 14 to provide a sensitive, desirable relay action.

As shown in Figs. 3 and 4, the bushings 16 and supported assemblage of components are enclosed by a cylindrical cup-shaped housing 18 having a rear wall or closure 19 which is apertured so that it may be passed over the terminal studs 15 at their rear portions, and be secured in place by the nuts 17. The apertures in the wall 19 are large enough to admit insulating bushings 20 carried by the studs 15, so that the latter are insulated from the housing 18.

Referring to Figs. 5 and 6 the instrument movement 14 includes a scale 21 and a pivotally mounted pointer 22 adapted to traverse the scale. If, as described in the present application, the instrument movement 14 is to be actuated by current from a thermocouple so that the instrument functions as a pyrometer, the scale 21 may be graduated in degrees of temperature up to 350° as shown in Fig. 1, as well as graduated in integers from zero to three, the latter indicating, for instance, zones corresponding to certain temperature conditions of the equipment being controlled.

The instrument movement 14 may comprise a permanent horseshoe magnet 23 having pole pieces 24 surrounding and spaced from a cylindrical magnetic core 25. The pointer 22, Fig. 6, may have an angular offset 26 and a supporting portion 27 which latter is mounted by means of a pivot 28 in operative relation with the core 25 and pole pieces 24. The portions 27 of the pointer 22 has secured to it a substantially rectangular actuating coil 29 adapted to occupy, in various rotative positions, the space between the poles 24 and the core 25.

The instrument movement 14 has the usual spiral spring 30 for yieldably holding the pointer 22 and coil 29 in zero or unenergized position. Zero adjustment is provided by a screw 31 rotatably mounted on the transparent pane 12 and having an eccentric driving lug 32 engaging a fork 33 which mounts one end of the coil spring 30 of the movement.

According to the present invention a novel, sensitive and delicate contact means is provided for operation by the pointer 22 of the instrument movement 14. This contact means comprises at least one contacting element in the form of an extremely fine metal wire or strip, preferably formed of platinum which resists oxidation and tarnishing. The contact means is so arranged that when the pointer 22 reaches any one of a plurality of possible, different predetermined positions, depending on the setting of an adjustment provided, the extremely fine platinum element will engage with very light pressure a cooperating contact element, to complete an electric circuit. The contact pressures existing during such engagement are extremely light, and I therefore apply the term "micro pressure" to the contact means. The reason for this micro pressure is that a contact resistance as high as 500,000 ohms may be present without impairing the reliability of the relay operation.

The associated assemblage of electrical and circuit components carried at the rear of the instrument casing 10 within the housing 18, is adapted and organized to utilize the minute contact pressures of the novel contact means operable by the pointer 22, so that a reliable relay action is obtained for the purpose of actuating cooling apparatus associated with the engine or other equipment to which the instrument movement 14 is connected.

Accordingly, in providing such contact means, referring to Figs. 5 and 6, the portion 27 of the pointer 22 has mounted on it a platinum wire 34 of comparatively short length, and of very fine diameter. I have found that a wire of only .002" in diameter is satisfactory for the contact element 34. This wire may be secured at its one end to the pointer portion 27 in any suitable manner, for instance by soldering as shown.

For cooperation with the resilient contact element 34 a comparatively heavy and rigid contact arm 35 is provided of platinum or having a platinum coating, said arm at one end being mounted on a stud 36 which is rotatably carried by the transparent pane 12 of the instrument, and which extends through the latter and at its outer end has a knurled flange 37 for engagement by the fingers. The contact arm 35 extends along the inside of the transparent pane 12 parallel therewith and spaced therefrom so that it lies in the path of arcuate movement of the free end of the wire 34 to be engaged thereby when the pointer 22 is moved. By grasping the flange 37, the stud 36 may be turned, so as to shift the contact arm 35 to various rotative positions, thereby changing the setting or position at which the pointer 22 causes contact to be made between the arm 35 and the resilient wire 34.

For the purpose of preventing flexing of the wire 34 beyond its elastic limit by its engagement with the arm 35, and therefore preventing permanent deformation of the wire, a positive stop is provided for the pointer 22 in the form of an extension 38 of the arm 35, extending at right angles to the latter and adapted to engage the pointer 22 after it has moved a slight amount beyond the point of engagement of the wire 34 and arm 35. Thus, when the coil 29 of the instrument movement is energized sufficiently to cause engagement of the wire 34 with the contact arm 35, the stop 38 will, by preventing any considerable further movement of the pointer, protect the wire 34 against permanent deformation.

In accordance with this invention means are also provided for preventing free vibration of the wire 34, and also for causing the initial contact pressures between the wire 34 and 35 to be greater than would normally occur with a free wire length. In accomplishing this, a second very fine resilient wire 39, preferably also of platinum .002" in diameter is provided, mounted on the pointer 22 so as to engage under pressure the wire 34 at a point adjacent its free end. As shown in Fig. 6, the wire 39 may be anchored at one end to the pointer 22 in any suitable manner as by soldering, and may extend in a direction toward the axis of the pointer, sufficiently to cross the wire 34 ahead of the latter. Normally the wires 34 and 39 are biased so that they press against each other to a degree. Thus, free vibration of the wire 34 is prevented, and this is an important factor when the relay device of the invention is used, for instance, in aircraft where vibration is present under operating conditions. The damping of the wire 34 eliminates the possibility of inadvertent contact of the wire with the arm 35 when these are close together but not supposed to touch, and therefore inaccuracy in the operation of the device is obviated. Also, when the pointer 22 is made to advance due to energization of the coil 29, at the instant that the biased wire 34 engages the contact arm 35 the pressure of such engagement will be greater than if the wire 34 were not biased, because the free end of a wire of such fineness would require but very little force to deflect it, whereas the end of a biased wire would require a greater force to deflect it.

The force of the coil 29 moving the pointer 22 is sufficient to cause such deflection in the wire 34, and therefore after engagement of the wire with the arm 35, the pointer may move a slight additional amount until it reaches and engages the stop 38. At the initiation of such engagement of the wire 34 and the arm 35, the contacting pressure, therefore, will be comparatively great considering the fineness of the wire and its length.

By the provision of the assemblage of electrical and circuit components comprising the part of the relay unit mounted within the housing 18, the contact pressures between the wire 34 and arm 35 are sufficient for utilization to obtain a reliable relay action, and as a result there are not required such auxiliary devices, used in prior instrument relays, as magnetic pull-ins, clockworks, etc., in connection with the contact means of the instrument.

In consequence, the pointer 22 and resilient elements 34 and 39 carried thereby are free to move away from the contact arm 35 and stop 38 at any time that the energization of the coil 29 drops below the value required to maintain the contacting engagement. The response of the instrument movement and contacting means of this invention is therefore extremely rapid and sensitive to variations in the energization of the coil 29. It is impossible for the contacting means to inadvertently stick or become jammed at any time, as is also the case with the pointer 22.

When the energization of the coil 29 is maintained at value sufficient to hold the pointer 22 against the stop 38, the electrical connection between the wire 34 and the arm 35 will be continuous, and will not be interrupted as in prior devices of this character, and therefore the scope of use of the device of this invention is not limited or restricted thereby.

Since no clockwork mechanisms are required, with the attendant continual rewinding where alternating current is not available the device of this invention does not require attention from time to time, but instantly responds automatically solely to the variations of current in the coil 29 at the predetermined energization value as determined by the setting of the arm 35.

The coil 29 is not subjected to strong currents of reverse polarity to cause separation of the contacts, as in some prior devices of this character, and therefore likelihood of the coil being inadvertently burned out is obviated, as well as likelihood of the contact structures being deformed by the separating force.

Electrical connection of the flexible element 34 may be made through the coil spring 30, which also may act as a current lead for the coil 29, and connection to the arm 35 may be made through a metal washer or bushing 40 shown in Fig. 6.

The complete relay device or assemblage of the present invention is adapted to be placed as a single compact unit in any convenient part of an aircraft, as the cockpit for instance, and there energized from the current supply of the craft. Such energization which is required for the assemblage portion mounted on the rear of the instrument casing 10 may be brought in any suitable manner, as for instance by means of a cable fitting 41, Figs. 2, 3 and 4, secured to the rear wall 19 of the housing 18. The heat developed in consequence of the energization of the assemblage within the housing 18 may be dissipated by direct radiation from the surface of said housing, and such heat is isolated from the instrument movement 14 by the rear wall 13 of the instrument casing 10, and by virtue of the fact that the movement 14 is entirely enclosed and isolated by the casing 10.

Referring to Figs. 3, 4 and 7, there is provided by the invention an assemblage of electrical and circuit components for cooperation with the instrument movement 14 and contact means operated thereby, so as to obtain a reliable relay action in response to energization of the instrument coil 29 and the consequent micro-pressure engagement between the wire 34 and arm 35.

This assemblage comprises a vacuum tube 42 which may be of the four-element heater type, having a cathode 43, heater 44, grid 45, screen grid 46 and anode 47. The vacuum tube 42 may be mounted in a socket 48 secured to the rear wall 13 of the instrument casing as shown.

Connected with the anode 47 of the vacuum tube is a coil 49 of an electromagnetic relay 50 having an armature 51 and cooperable contacts 52 and 53. The other end of the relay coil 49 is connected by a wire 54 to one terminal 55 of the cable fitting 41. The screen grid 46 of the vacuum tube is also connected, by a wire 56, to the terminal 55 of the cable fitting 41, and the wire 56 is connected with one end of a drop resistor having sections 57, 58 and 59, the end of the latter section being connected by a wire 60 to the relay contact 53.

The heater 44 of the vacuum tube 42 is bridged across the drop resistor section 58 by wires 61 and 62, and the cathode 43 of the tube is connected by a wire 62a to the wire 62.

Circuit connections are also made as follows: The armature 51 of the electromagnetic relay 50 is connected by a wire 63 to a terminal 64 of the cable fitting 41, and a pilot light 65 is connected by wires 66 and 67 respectively to the wires 60 and 63.

As shown in Fig. 7, the source of energy of the aircraft, as represented by a battery 68, may be connected by wires 69 and 70 to the fitting terminals 55 and 64 respectively, thus energizing the dropping resistor 57, 58 and 59 through the pilot light 65.

The grid 45 of the vacuum tube 42 is connected by a wire 71 to a resistor 72 which is in turn connected by a wire 73 to the coil spring 30 of the instrument movement, which spring is connected with the contact element 34 of the movement. A grid leak 74 and condenser 75 are each connected between the wires 73 and 60 as shown. The stationary adjustable contact arm 35 of the instrument movement 14 is connected by a wire 76 through a current limiting resistor 77 and wire 78 to the wire 61.

Connections for the instrument coil 29 are made through wires 79 and 80, and through a resistor 81 to the terminal studs 15, these studs being connected to leads 15a and 15b from a thermocouple 15c located in the equipment to be controlled, to receive heat therefrom. A wire 82 is connected from the contact 52 to a terminal 83 of the fitting 41.

Any suitable cooling means may be employed with the engine or other equipment having the thermocouple 15c. If, as shown in Fig. 7, the battery 68 is to be used as a source of energy to actuate the cooling means, a solenoid 83a for operating said means may be connected by wires 83b and 83c respectively to the terminal 83 and wire 54. Or, control of the cooling means may be effected by connections to the terminals 83 and 64, which are united and separated electrically by the armature 51.

The operation of the device is as follows: With the contact arm 35 in an adjusted position as shown by the dotted lines of Fig. 5, energization of the instrument coil 29 due to the heating of the thermocouple 15c will cause the pointer 22 to advance over the scale 21, indicating the temperature of the thermocouple. As this temperature increases, the pointer 22 will advance and finally cause the contact element 34 to engage the contact arm 35, and the pointer to engage the stop 38. This will complete the circuit through the wires 73 and 76, even though extremely small, micropressures may be present during such engagement. The circuit comprising the wires 73, 76 is the grid circuit for the vacuum tube 42, and only extremely minute currents are carried thereover. Thus, the contacts 34 and 35 are not called upon to carry any appreciable current, and the fact that they contact each other even with only slight pressures results in an alteration of the electron charge of the grid 45, thereby causing an increase in the anode current through the relay coil 49 sufficient to actuate the relay 50.

This results in the armature 51 of the relay being separated from the contact 52, de-energizing the solenoid 83a, and results in the armature being moved into engagement with the contact 53.

De-energization of the solenoid 83a will cause the cooling means to become effective, and thus the equipment having the thermocouple 15c will start to cool off. When sufficient cooling is effected, the pointer 22 will be retracted from its position against the stop 38 due to the decrease in energization of the instrument coil 29. At the time that the pointer has moved to a degree sufficient to separate the contacts 34 and 35, the charge on the grid 45 of the vacuum tube will again be altered, reducing the flow of anode current through the relay coil 49, thereby deenergizing the latter and releasing the armature 51 so that it may again engage the contact 52.

Thus, a continuous automatic control may be had over the heat of an aircraft engine or the like, to which the thermocouple 15c is attached.

During the periods that the relay 50 is deenergized, the armature 51 thereof being separated from the contact 53, the pilot light 65 will be lighted. However, when the relay 50 is energized, causing the armature 51 to engage the contact 53, the pilot light 65 will be short-circuited and will therefore not glow.

The pilot light 65 may be of any suitable type. However, it is preferred to have it of the miniature type which may be mounted on a removable screw base 84, Fig. 2, which is secured to the end wall 19 of the housing 18. A light-conducting rod 85 of plastic, Fig. 1, may be extended from the pilot light 65 through the scale 21 so that the illumination from the light may be observed through the transparent pane 12.

The relay device of this invention is thus seen to be of small and compact construction and light weight, and therefore readily adapted for use in aircraft, for instance. The device may be located at a point remote from the engine or other equipment whose temperature is to be controlled, and therefore it may be installed in a cockpit or other convenient location.

A reliable, instantaneous, and sensitive relay action is obtained at all times due to the provision of the novel contact means associated with the instrument movement 14, and due to the assemblage of electrical and circuit components adapted to utilize the micropressures of said contact means. Since the adjustment stud 36 and flange 37 thereof project from the face of the instrument, the setting of the contact arm 45 may be quickly and conveniently accomplished.

Also, by the provision of the pointer 22 and scale 21, the temperature at which the relay is to function may be predetermined when setting the contact arm 35, and the temperature condition of the engine or other equipment being controlled is available to an operator.

Variations and modifications may be made within the scope of this invention and portions of the improvements may be used without others.

I claim:

1. A sensitive-instrument relay comprising an instrument movement having a movable element; a stationary contact; a delicate, resilient contact mounted on the movable element to move therewith, said resilient contact being adapted to engage the stationary contact when the instrument movement is sufficiently energized; and a delicate, resilient member carried by the movable element, pressing against the resilient contact and yieldably holding the latter biased to restrict vibration of the said contact.

2. A sensitive-instrument relay comprising an electric instrument movement having a movable element; an adjustable stationary contact; a delicate, resilient contact mounted on the movable element to move therewith, said resilient contact being adapted to engage the stationary contact when the instrument movement is sufficiently energized; and a stop fixed to the stationary contact, for engagement with the said movable element to prevent the latter, after engaging the delicate resilient contact, from flexing the said contact beyond its elastic limit.

3. A sensitive-instrument relay comprising an electric instrument movement having a movable element and a pointer attached thereto; a scale cooperable with the pointer; a fine, resilient metal wire at one end secured to the pointer to move therewith; a stationary electrical contact mounted in front of the scale, for engagement with the free end of the wire, said contact having a stop for engagement with the pointer after the wire has been engaged; and means for adjusting the stationary contact so that it may be engaged by the wire when the pointer is at different positions on the scale.

4. A sensitive-instrument relay comprising an instrument movement having a movable element; a stationary contact; a platinum wire approximately .002" thick, mounted on the movable element to move therewith, said wire having a free portion adapted to engage the stationary contact when the instrument movement is energized; and a second platinum wire approximately .002" thick, carried by the movable element, pressing against the first platinum wire and yieldably holding the latter biased to restrict vibration of the said first wire.

5. A sensitive-instrument relay comprising an electric instrument movement having a movable element; a pair of fine metal wires crossing each other, each secured at one end to the movable element, the said wires pressing against each other; and a stationary contact adjustably mounted with respect to the instrument movement, said contact being adapted to engage one of said wires when the movable element reaches a predetermined position, and said contact having a positive stop for engagement with the movable element after the said engagement of the contact with the wire.

6. A sensitive-instrument relay comprising an instrument movement having a movable element; a pair of fine metal wires crossing each other, each secured at one end to the movable element, the said wires pressing against each other; and a stationary contact mounted for engagement by one of said wires when the movable element reaches a predetermined position.

7. A relay unit comprising a vacuum tube; means for energizing the vacuum tube from a single source of current, including a drop resistor coupled to the elements of the tube; an electro-responsive device permanently connected with the drop resistor to be energized from the source of current; means for short-circuiting and rendering said device inoperative when the tube is conducting; a sensitive-instrument movement; and micro-pressure contact means operable by said movement, said contact means being connected to the grid of the tube and, when actuated, altering the charge on the grid so that the tube becomes conducting and causes the electro-responsive device to be rendered inoperative.

8. A sensitive-instrument relay comprising an electric instrument movement having a movable element; a stationary contact; a delicate, resilient contact mounted on the movable element to move therewith, said resilient contact being adapted to engage the stationary contact when the instrument movement is sufficiently energized; and a member carried by the movable element, pressing against the resilient contact and holding the latter biased to restrict vibration of the said contact.

9. A sensitive-instrument relay comprising an electric instrument movement having a movable element; a pair of metal wires crossing each other, each secured at one end to the movable element, the said wires pressing against each other and at least one of said wires being of fine size; and a stationary contact mounted for engagement by said wire of fine size when the movable element reaches a predetermined position.

10. A sensitive instrument relay comprising an electric instrument movement having a movable member; an adjustable stationary member insulated from the movable member; a delicate, resilient contact mounted on one of said members, said contact being adapted to engage the other member when the instrument movement is sufficiently energized; and a stop fixed with respect to the said other member, for engagement with the said one member to prevent flexure of the delicate contact beyond its elastic limit after engagement of the contact with the other member.

KNUD J. KNUDSEN.

REFERENCES CITED

The following references are of record in the file of this patent:

UNITED STATES PATENTS

| Number | Name | Date |
| --- | --- | --- |
| 683,831 | Arcioni | Oct. 1, 1901 |
| 982,839 | MacDonald | Jan. 31, 1911 |
| 1,004,420 | Haagn | Sept. 26, 1911 |
| 1,138,560 | Helfer | May 26, 1915 |
| 1,410,120 | Radley | Mar. 21, 1922 |
| 1,593,626 | Foote | July 27, 1926 |
| 1,721,216 | Hardy | July 16, 1929 |
| 1,824,933 | Scholtz | Sept. 29, 1931 |
| 1,870,884 | Winning | Aug. 9, 1932 |
| 2,095,124 | Cockrell | Oct. 5, 1937 |
| 2,272,714 | Lamb | Feb. 10, 1942 |
| 2,296,719 | Looney | Sept. 22, 1942 |
| 2,304,513 | Stearns | Dec. 8, 1942 |

FOREIGN PATENTS

| Number | Country | Date |
| --- | --- | --- |
| 396,821 | Germany | June 10, 1924 |